United States Patent
Kwon et al.

(10) Patent No.: US 10,790,484 B2
(45) Date of Patent: Sep. 29, 2020

(54) SECONDARY BATTERY (71) Applicant: Samsung SDI Co., Ltd., Yongin-si, Gyeonggi-do (KR)

(72) Inventors: Doyeon Kwon, Yongin-si (KR); Daeyon Moon, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1032 days.

(21) Appl. No.: 14/924,589

(22) Filed: Oct. 27, 2015

(65) Prior Publication Data
US 2016/0156000 A1 Jun. 2, 2016

(30) Foreign Application Priority Data
Nov. 28, 2014 (KR) .................... 10-2014-0169172

(51) Int. Cl.
H01M 2/06 (2006.01)
H01M 2/08 (2006.01)
H01M 2/04 (2006.01)

(52) U.S. Cl.
CPC ........... *H01M 2/06* (2013.01); *H01M 2/0404* (2013.01); *H01M 2/0473* (2013.01); *H01M 2/08* (2013.01); *H01M 2220/30* (2013.01)

(58) Field of Classification Search
CPC .... H01M 2/06; H01M 2/0404; H01M 2/0473; H01M 2/08
See application file for complete search history.

(56) References Cited

U.S. PATENT DOCUMENTS

2010/0086845 A1 4/2010 Jung et al.
2010/0266877 A1 10/2010 Ebihara et al.

FOREIGN PATENT DOCUMENTS

| JP | 2006-331819 A | 12/2006 |
| JP | 2010-050406 A | 3/2010 |
| JP | 2011-243352 A | 12/2011 |
| KR | 10-1999-015649 A | 3/1999 |
| KR | 10-0821857 B1 | 4/2008 |
| KR | 10-0863798 B1 | 10/2008 |
| KR | 10-2010-0116135 A | 10/2010 |

OTHER PUBLICATIONS

Korean Office Action dated Sep. 18, 2015 for Korean Patent Application No. KR 10-2014-0169172, which cites the above-identified references numbered 2-4, and from which priority is claimed by subject U.S. Appl. No. 14/924,589.

Primary Examiner — Ula C Ruddock
Assistant Examiner — Frank A Chernow
(74) Attorney, Agent, or Firm — Knobbe Martens Olson & Bear LLP (57) ABSTRACT A secondary battery is disclosed. In one aspect, the secondary battery includes a battery cell including an electrode and a cap cover placed over the battery cell and having an opening that exposes the electrode. The secondary battery also includes a connection member placed over the cap cover and electrically connected to the electrode. The secondary battery further includes a coupling structure that couples the battery cell and the cap cover. The coupling structure includes a protrusion extending away from the cap cover toward the battery cell, an adhesive pocket formed around the protrusion, and a concave portion formed in the battery cell so as to receive the protrusion.

14 Claims, 5 Drawing Sheets

SECONDARY BATTERY

INCORPORATION BY REFERENCE TO ANY PRIORITY APPLICATIONS

This application claims the benefit of Korean Patent Application No. 10-2014-0169172, filed on Nov. 28, 2014, in the Korean Intellectual Property Office, the disclosure of which is incorporated herein in its entirety by reference.

BACKGROUND

1. Field

The described technology generally relates to a secondary battery.

2. Description of the Related Technology

With the development of wireless Internet and communication technology, the use of electronic devices such as cellular phones or portable computers equipped with secondary (rechargeable) batteries has become widespread. These devices can be used anywhere without the constant need for access to power outlets.

SUMMARY OF CERTAIN INVENTIVE ASPECTS

One inventive aspect is a secondary battery configured to prevent external defects caused by overflowing of an adhesive used to bond a battery cell and a cap cover together.

Another aspect is a secondary battery configured to easily align a battery cell with a cap cover.

Another aspect is a secondary battery that includes: a battery cell including an electrode; a cap cover placed on the battery cell and including an opening that exposes the electrode; a connection member placed on the cap cover and electrically connected to the electrode; and a coupling structure through which the battery cell and the cap cover are coupled together, the coupling structure including a protrusion protruding from the cap cover, an adhesive pocket formed around the protrusion, and a concave portion formed in the battery cell to receive the protrusion.

The adhesive pocket can surround the protrusion.

The adhesive pocket can entirely surround the protrusion to isolate the protrusion like an island.

The adhesive pocket can be a groove formed around the protrusion.

The secondary battery can further include position alignment ribs formed on the cap cover and protruding toward the battery cell.

The position alignment ribs can cover upper edges of the battery cell.

The position alignment ribs can be formed in a length direction of the cap cover.

The position alignment ribs can be formed as a pair on both sides of the cap cover to receive an upper portion of the battery cell therebetween.

The cap cover can include a pair of long sides extending in a length direction thereof, and corner portions rounded from ends of the long sides, wherein the position alignment ribs can be formed along the pair of long sides.

The position alignment ribs does not extend to the corner portions.

The electrode can include first and second electrodes formed on an upper surface of the battery cell and having different polarities.

The connection member can include first and second connection members electrically connected to the first and second electrodes, respectively.

The first and second connection members can overlap each other and extend in parallel with each other.

The opening can include first and second openings through which the first and second electrodes are respectively exposed.

A temperature-sensing element can be placed between the first electrode and the first connection member, and the cap cover can further include a third opening that exposes the temperature-sensing element.

Another aspect is a secondary battery comprising a battery cell including an electrode, a cap cover placed over the battery cell and having an opening that exposes the electrode, a connection member placed over the cap cover and electrically connected to the electrode, and a coupling structure that couples the battery cell and the cap cover, wherein the coupling structure comprises a protrusion extending away from the cap cover toward the battery cell, an adhesive pocket formed around the protrusion, and a concave portion formed in the battery cell so as to receive the protrusion.

In the above secondary battery, the adhesive pocket surrounds the protrusion.

In the above secondary battery, the adhesive pocket substantially surrounds the protrusion.

In the above secondary battery, a groove is formed in the adhesive pocket to surround the protrusion.

The above secondary battery further comprises a plurality of position alignment ribs formed over the cap cover and protruding toward the battery cell.

In the above secondary battery, the battery cell has upper edges, wherein the position alignment ribs at least partially cover the upper edges of the battery cell.

In the above secondary battery, the position alignment ribs are formed in a length direction of the cap cover.

In the above secondary battery, the cap cover includes front and rear sides, wherein the battery cell includes an upper portion, and wherein the position alignment ribs include first and second position alignment ribs respectively formed over the front and rear sides of the cap cover so as to receive the upper portion of the battery cell therebetween.

In the above secondary battery, the cap cover comprises i) a pair of long sides extending in a length direction thereof and ii) a plurality of corner portions extending from opposing ends of the long sides, wherein the position alignment ribs are formed along the long sides.

In the above secondary battery, the position alignment ribs do not extend to the corner portions.

In the above secondary battery, the battery cell includes an upper surface, wherein the electrode comprises first and second electrodes formed over the upper surface of the battery cell and having different polarities.

In the above secondary battery, the connection member comprises first and second connection members electrically connected to the first and second electrodes, respectively.

In the above secondary battery, the first and second connection members at least partially overlap each other and extend substantially in parallel with each other.

In the above secondary battery, the opening of the cap cover comprises first and second openings respectively exposing the first and second electrodes.

The above secondary battery further comprises a temperature sensor placed between the first electrode and the first connection member, wherein a third opening is formed in the cap cover to expose the temperature sensor.

Another aspect is a secondary battery comprising a battery cell including an electrode and having a plurality of concave portions formed at the top of the battery cell and a cap cover placed over the battery cell and having an opening that exposes the electrode, wherein the cap cover includes a plurality of protrusions extending toward the battery cell and a plurality of adhesive pockets respectively formed around the protrusions, and wherein the concave portions of the battery cell respectively accommodate the protrusions, wherein an adhesive is formed at least in the adhesive pockets.

The above secondary battery further comprises a plurality of coupling structures that couples the battery cell to the cap cover, wherein each coupling structure includes one of each of the protrusions, the adhesive pockets, and the concave portions, and wherein the adhesive is formed in the coupling structures.

In the above secondary battery, the adhesive is not formed in a region adjacent to the adhesive pocket and between the cap cover and the top of the battery cell.

In the above secondary battery, the height of the protrusion is greater than that of the adhesive pockets.

In the above secondary battery, the adhesive pockets include a surface inclined with respect to the top of the battery cell.

DETAILED DESCRIPTION OF CERTAIN INVENTIVE EMBODIMENTS

Reference will now be made in detail to exemplary embodiments, examples of which are illustrated in the accompanying drawings, wherein like reference numerals refer to like elements throughout. In this regard, the present exemplary embodiments can have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items.

Secondary batteries will now be described in detail with reference to the accompanying drawings, in which exemplary embodiments are shown. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Figure 1:
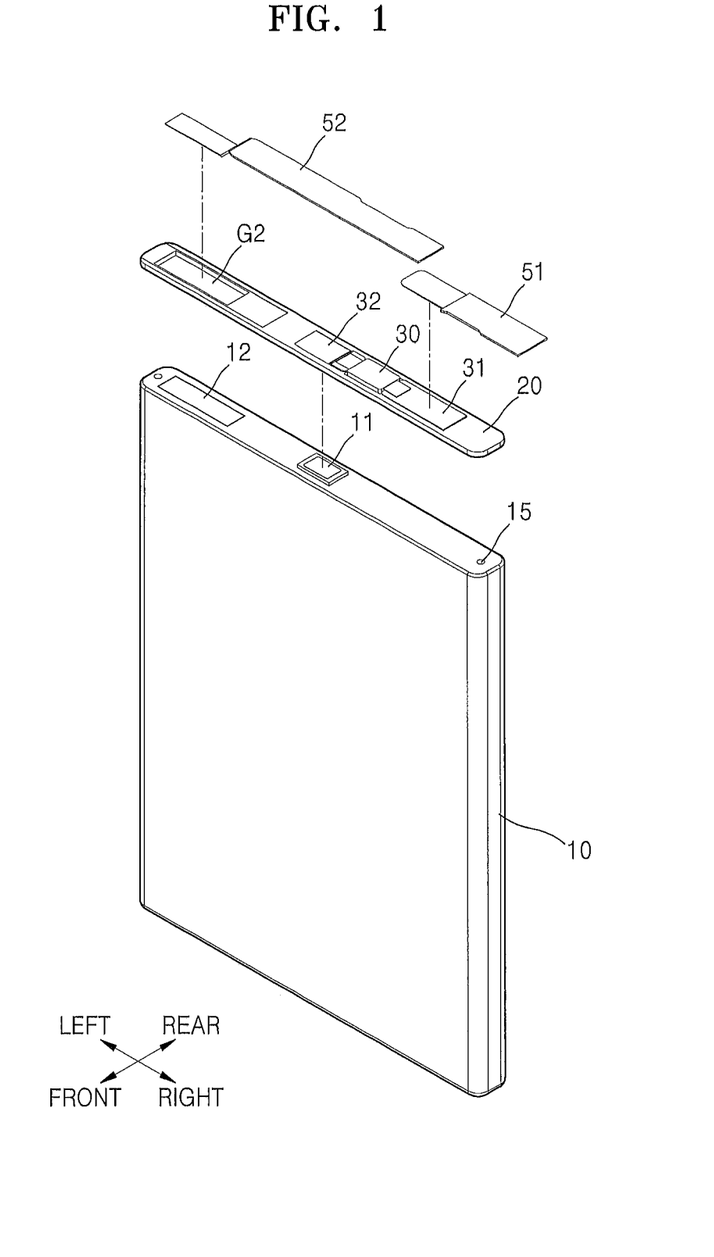
FIG. 1 is a perspective view illustrating a secondary battery according to an exemplary embodiment.
Figure 2:
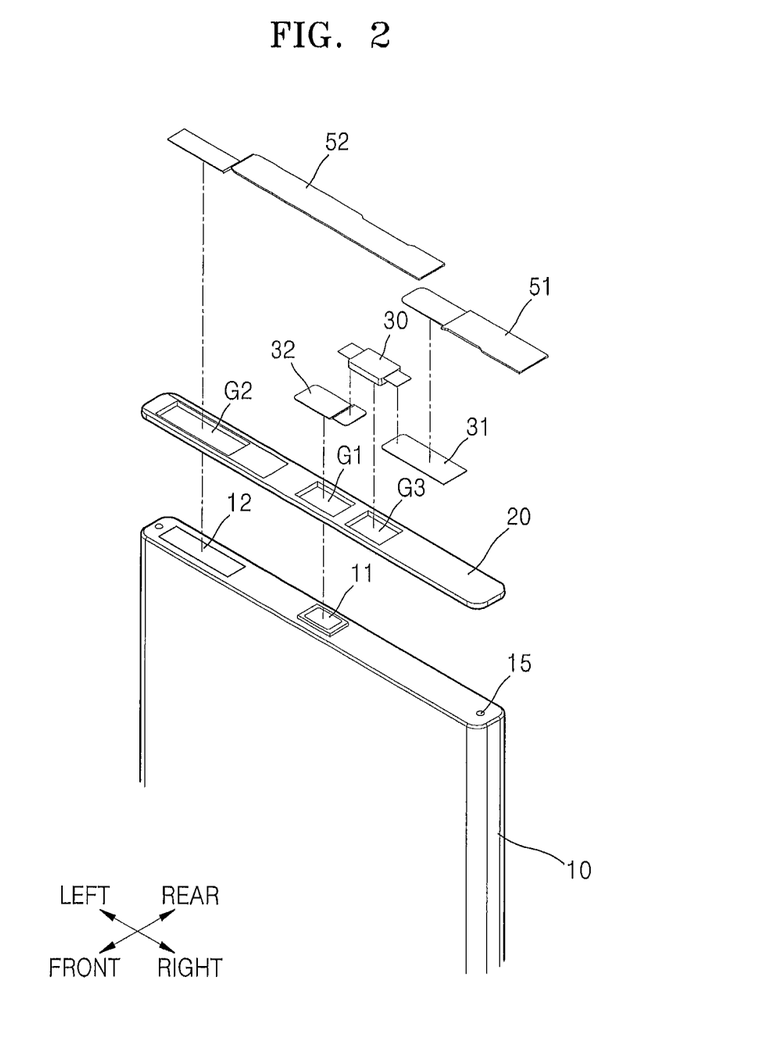
FIG. 2 is an exploded perspective view illustrating the secondary battery illustrated in FIG. 1.
Figure 3:
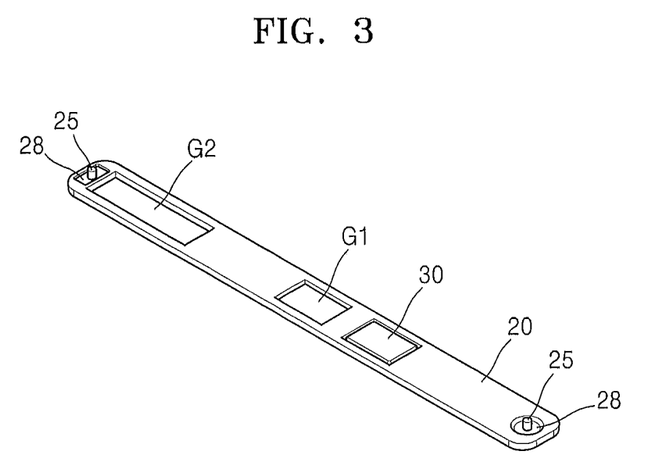
FIG. 3 is a perspective view illustrating another side of a cap cover illustrated in FIG. 2.

FIG. 1 is a perspective view illustrating a secondary battery according to an exemplary embodiment. FIG. 2 is an exploded perspective view illustrating the secondary battery illustrated in FIG. 1. FIG. 3 is a perspective view illustrating another side of a cap cover 20 illustrated in FIG. 2.

Referring to FIGS. 1 to 3, the secondary battery includes a battery cell 10 including electrodes 11 and 12. The secondary battery also includes the cap cover 20 placed on the battery cell 10 and including openings G1, G2, and G3, through which the electrodes 11 and 12 are exposed. The secondary battery further includes connection members 51 and 52 placed on the cap cover 20 and electrically connected to the electrodes 11 and 12. In addition, referring to FIGS. 1 and 3, the secondary battery further includes coupling structures for coupling between the battery cell 10 and the cap cover 20. In some embodiments, each of the coupling structures includes a protrusion 25 protruding from the cap cover 20, an adhesive pocket 28 formed around the protrusion 25, and a concave portion 15 formed in the battery cell 10 for receiving the protrusion 25.

The coupling structures couple the cap cover 20 to the battery cell 10. In some embodiments, the protrusion 25 and the concave portion 15 have matching shapes. After the cap cover 20 is substantially aligned with the battery cell 10, the cap cover 20 and the battery cell 10 can be coupled together by inserting the protrusion 25 into the concave portion 15. At this time, an adhesive can be applied between the protrusion 25 and the concave portion 15 for bonding the two elements 25 and 15. For example, the adhesive is filled in a space formed between the inner surface of the concave portion 15 and the outer surface of the protrusion 25 for fixing the position of the cap cover 20 to an upper surface of the battery cell 10.

The protrusion 25 and the concave portion 15 can be formed at mutually-facing positions of the cap cover 20 and the battery cell 10. For example, the protrusion 25 extends away from a bottom surface of the cap cover 20 toward the upper surface of the battery cell 10, and the concave portion 15 is formed in the upper surface of the battery cell 10 that faces the protrusion 25. The concave portion 15 can have any shape or type such as a recess or a hole as long as the concave portion 15 can receive the protrusion 25.

In some embodiments, each of the coupling structures includes the protrusion 25 formed on the cap cover 20 and the concave portion 15 formed in the battery cell 10. However, in other embodiments, the positions of the protrusion 25 and the concave portion 15 can be oppositely changed. For example, the protrusion 25 is formed on the upper surface of the battery cell 10, and the concave portion 15 is formed in the bottom surface of the cap cover 20.

Figure 4:
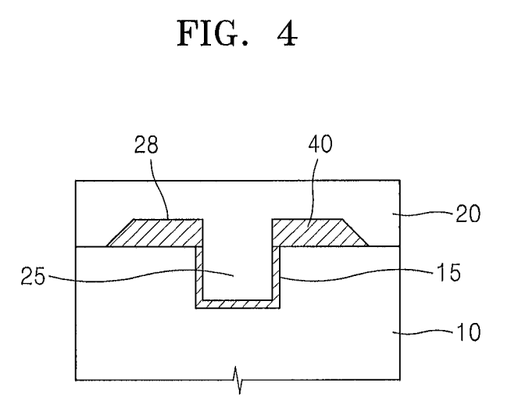
FIG. 4 is a view illustrating a coupled state of the cap cover and a battery cell.

FIG. 4 illustrates a coupled state of the cap cover 20 and the battery cell 10.

Referring to FIG. 4, the adhesive pocket 28 is formed around the protrusion 25. After an adhesive 40 is filled in the concave portion 15, that is, a space formed between the inner surface of the concave portion 15 and the outer surface of the protrusion 25, a surplus portion of the adhesive 40 can be filled in the adhesive pocket 28.

After the adhesive 40 is filled in the space between the concave portion 15 and the protrusion 25, the surplus portion of the adhesive 40 can remain between the cap cover 20 and the battery cell 10. If the surplus portion flows over the outside of the concave portion 15, a gap can be formed between the cap cover 20 and the battery cell 10, and thus, the height of the secondary battery can increase. In addition, it can be difficult to precisely control the height of the secondary battery due to the amount or behavior of the surplus portion of the adhesive 40.

However, in some embodiments, since the adhesive pocket 28 receives the surplus portion of the adhesive 40, an unnecessary gap is not formed between the cap cover 20 and the battery cell 10 and external defects caused by overflowing of the adhesive 40 is prevented.

Referring to FIG. 3, the adhesive pocket 28 surrounds the protrusion 25. For example, the adhesive pocket 28 surround substantially the entire portion of the protrusion 25 to isolate the protrusion 25 like an island. For example, the adhesive pocket 28 entirely surrounds the protrusion 25, and thus, the adhesive pocket 28 receives the surplus portion of the adhesive 40 in any direction.

The adhesive pocket 28 can be sufficiently large to receive the surplus portion of the adhesive 40. For example, the adhesive pocket 28 is a groove formed in the bottom surface of the cap cover 20. When the cap cover 20 is viewed from below, the adhesive pocket 28 can have any shape such as a substantially circular or rectangular shape as long as the adhesive pocket 28 can receive the surplus portion of the adhesive 40.

When the protrusion 25 is coupled to the concave portion 15, the adhesive pocket 28 formed around the protrusion 25 can be connected to a space formed between the protrusion 25 and the concave portion 15 to receive the surplus portion of the adhesive 40 overflowing from the space between the protrusion 25 and the concave portion 15. In some embodiments, the surplus portion of the adhesive 40 does not form an unnecessary gap between the cap cover 20 and the battery cell 10. For example, during an assembling process, the bottom surface of the cap cover 20 at least partially contacts the battery cell 10 without a gap formed by the surplus portion of the adhesive 40.

Referring to FIG. 2, the electrodes 11 and 12 include a first electrode 11 and a second electrode 12, and the openings G1, G2, and G3 of the cap cover 20 include first and second openings G1 and G2 to respectively expose the first and second electrodes 11 and 12. The first and second electrodes 11 and 12 exposed through the first and second openings G1 and G2 can be respectively connected to the connection members 51 and 52. The opening G1, G2, and G3 of the cap cover 20 can include a third opening G3 to expose a temperature-sensing element or temperature sensor 30.

The connection members 51 and 52 can include first and second connection members 51 and 52 electrically connected to the first and second electrodes 11 and 12 of the battery cell 10, respectively. The first and second connection members 51 and 52 can connect the battery cell 10 to a protective circuit (not shown) for forming a charging and discharging current path. For example, ends of the first and second connection members 51 and 52 are placed close to the first and second electrodes 11 and 12 of the battery cell 10 for direct or indirect connection to the first and second electrodes 11 and 12, and the other ends of the first and second connection members 51 and 52 are connected to the protective circuit (not shown).

The first and second connection members 51 and 52 can overlap each other on the cap cover 20 and can extend substantially in parallel with each other. In the exemplary embodiment shown in FIGS. 1 to 3, the first connection member 51 extends outwardly from the battery cell 10, and the second connection member 52 does not extend outwardly from the battery cell 10. However, the described technology is not limited thereto. For example, both the first and second connection members 51 and 52 can extend outwardly from the battery cell 10 according to the position of the protective circuit (not shown). That is, the lengths of the first and second connection members 51 and 52 can vary according to positions at which the first and second connection members 51 and 52 are connected to the protective circuit (not shown).

The first and second connection members 51 and 52 can include conductive patterns (not shown) for forming current paths, and insulation coatings (not shown) for insulating the conductive patterns. In the exemplary embodiment, the first and second connection members 51 and 52 refer to any members electrically connected to the battery cell 10 for forming the charging and discharging current path. For example, the first and second connection members 51 and 52 include tabs, coverlays, plates, terminals, etc.

In the exemplary embodiment shown in FIGS. 1 to 3, only one battery cell 10 is shown. However, the described technology is not limited thereto. That is, in other exemplary embodiments, two or more neighboring battery cells 10 are electrically connected to each other through connection members 51 and 52. For example, neighboring battery cells 10 are connected in series or parallel by electrically connecting connection members 51 and 52 extending from a battery cell 10 to electrodes of another battery cell 10.

Furthermore, the first connection member 51 can be electrically connected to the first electrode 11 through the temperature-sensing element 30. That is, the temperature-sensing element 30 can be placed between the first electrode 11 and the first connection member 51 for forming the charging and discharging current path.

Lead terminals 31 and 32 can be placed on both ends of the temperature-sensing element 30. For example, the lead terminal 32 is electrically connected to the first electrode 11 exposed upward through the first opening G1. The lead terminal 31 can be connected to the first connection member 51.

The third opening G3 can be formed through the cap cover 20 and expose the temperature-sensing element 30. The temperature-sensing element 30 can be placed close to the battery cell 10 for precisely measuring the temperature of the battery cell 10. For example, the third opening G3 is formed through the cap cover 20 and expose the temperature-sensing element 30 to the upper surface of the battery cell 10.

Figure 5:
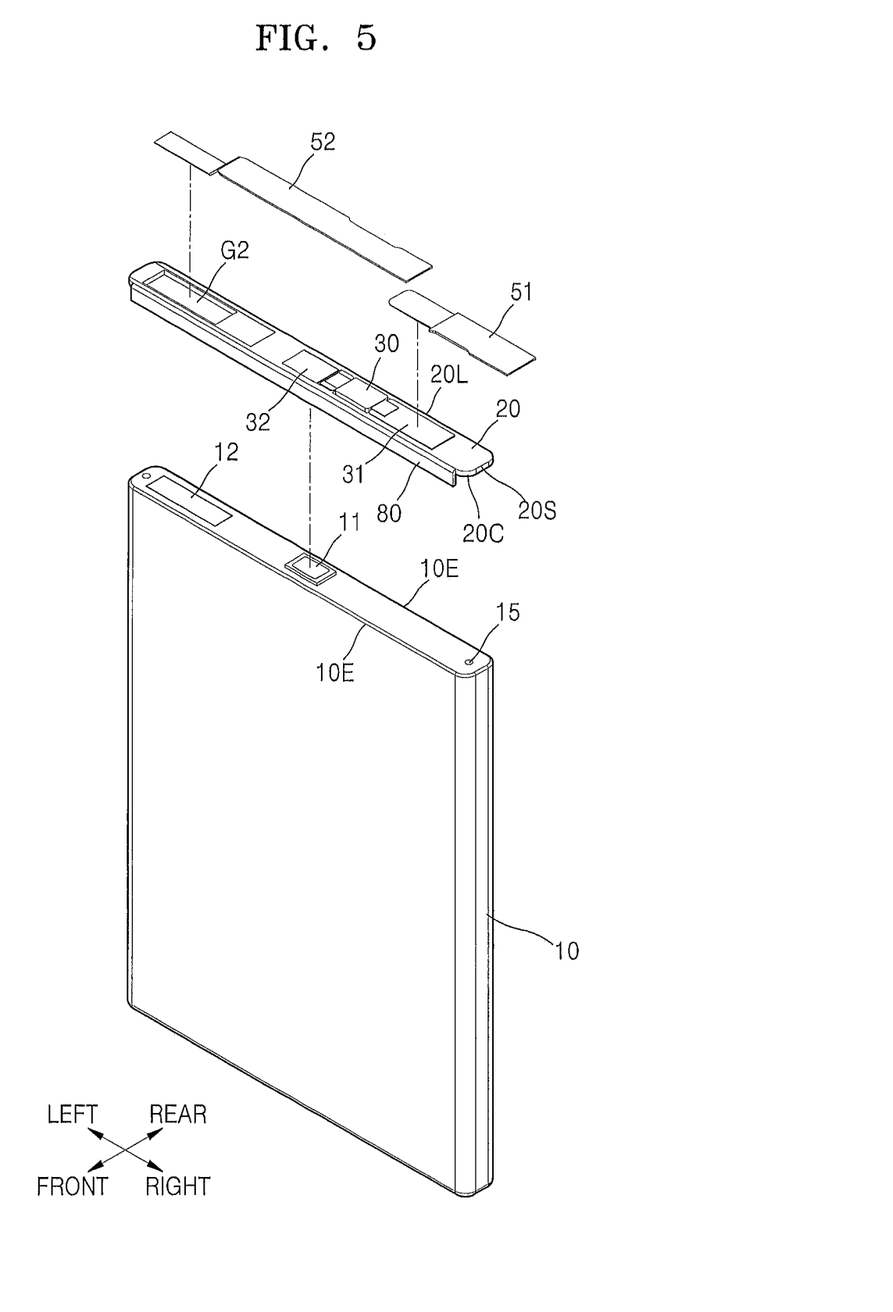
FIG. 5 is a perspective view illustrating a secondary battery according to another exemplary embodiment.
Figure 6:
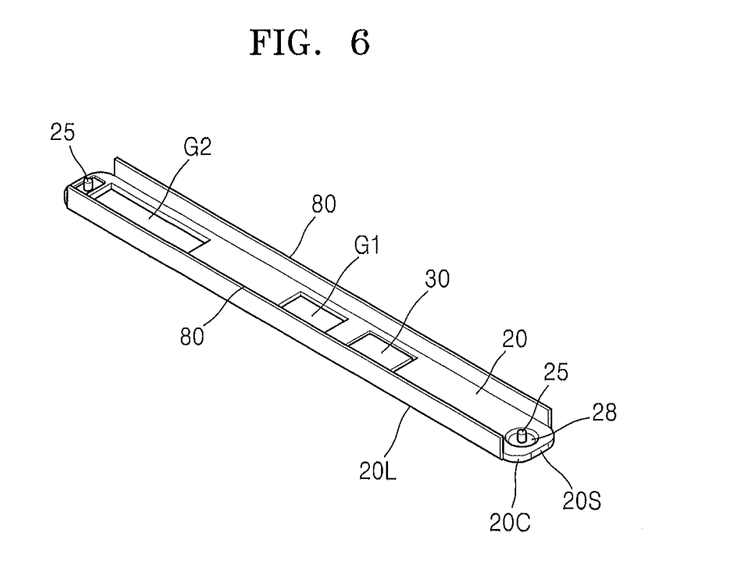
FIG. 6 is a perspective view illustrating a cap cover illustrated in FIG. 5.

FIG. 5 is a view illustrating a secondary battery according to another exemplary embodiment. FIG. 6 is a perspective view illustrating a cap cover 20 illustrated in FIG. 5.

Referring to FIGS. 5 and 6, the secondary battery includes a battery cell 10 including first and second electrodes 11 and 12. The cap cover 20 is placed on the battery cell 10 and includes openings G1 and G2 through which the first and second electrodes 11 and 12 are respectively exposed. The secondary battery also includes first and second connection members 51 and 52 placed on the cap cover 20 and electrically connected to the electrodes 11 and 12.

In some embodiments, position alignment ribs 80 are formed on the cap cover 20. The position alignment ribs 80 can be formed for position alignment between the cap cover 20 and the battery cell 10. For example, during an assembling process, the cap cover 20 is kept in place without moving from a proper assembling position after the position alignment ribs 80 are brought into contact with a portion of the battery cell 10. The position alignment ribs 80 can be brought into contact with upper edges 10E of the battery cell 10 for alignment between the cap cover 20 and the battery cell 10. For example, the position alignment ribs 80 cover the upper edges 10E of the battery cell 10.

The position alignment ribs 80 can be formed along edges of the cap cover 20. The position alignment ribs 80 can extend along the length of the cap cover 20. For example, the position alignment ribs 80 are formed along front and rear edges of the cap cover 20.

The position alignment ribs 80 can be provided as a mutually-facing pair. The position alignment ribs 80 can be provided as a pair facing each other in a front-to-rear direction. An upper portion of the battery cell 10 can be placed between the position alignment ribs 80, and thus, the cap cover 20 and the battery cell 10 can be precisely aligned. That is, after the upper portion of the battery cell 10 is placed between the position alignment ribs 80, positional deviation can be prevented in the front-to-rear direction.

The formation positions of the position alignment ribs 80 will now be described in more detail. The cap cover 20 can have a substantially rectangular shape including a pair of long sides 20L and a pair of short sides 20S, and the position alignment ribs 80 can be formed along the long sides 20L of the cap cover 20.

Rounded corner portions 20C can be formed between the long sides 20L and the short sides 20S of the cap cover 20. In some embodiments, the position alignment ribs 80 formed along the long sides 20L do not extend to the corner portions 20C, which extend from ends of the long sides 20L. For example, a label sheet (not shown) is attached to the position alignment ribs 80 to wrap the battery cell 10. In this case, if the position alignment ribs 80 include rounded portions as well as straight portions, blisters can be easily formed when the label sheet is attached to the rounded portions. Therefore, in some embodiments, the position alignment ribs 80 are formed only along the long sides 20L that are substantially straight. That is, in some embodiments, the position alignment ribs 80 do not extend to the corner portions 20C.

In the exemplary embodiment shown in FIGS. 5 and 6, coupling structures can also be formed for coupling between the cap cover 20 and the battery cell 10, and detailed descriptions thereof will not be repeated. In some embodiments, coupling positions of the cap cover 20 and the battery cell 10 can also be determined by protrusions 25 and concave portions 15 that are formed between the cap cover 20 and the battery cell 10 and have matching shapes. In the current embodiment, since the position alignment ribs 80 are further formed, the cap cover 20 and the battery cell 10 are aligned more easily.

In some embodiments, the battery cell 10 is electrically connected to the first and second connection members 51 and 52 by performing a thermal joining process such as welding on a plurality of positions. In detail, to electrically connect the first electrode 11 and the first connection member 51 through the temperature-sensing element 30, the lead terminal 32 placed on an end of the temperature-sensing element 30 can be welded to the first electrode 11, or the lead terminal 31 placed on the end of the temperature-sensing element 30 can be welded to the first connection member 51. In addition, the second electrode 12 and the second connection member 52 can be connected through a thermal joining process such as welding.

During such a thermal joining process, the position of the cap cover 20 can vary, and the cap cover 20 can deviate from a proper assembling position when a welding electrode (not shown) touches or impacts the cap cover 20. However, in some embodiments, since the position alignment ribs 80 are formed, relative positions of the cap cover 20 and the battery cell 10 are firmly fixed.

As described above, according to at least one of the disclosed embodiments, the adhesive pocket 28 is formed to receive a surplus portion of an adhesive used to bond the battery cell 10 and the cap cover 20 together. Thus, in some embodiments, a gap is not formed between the battery cell 10 and the cap cover 20, and the total height of the secondary battery is precisely controlled. In addition, in some embodiments, since the surplus portion of the adhesive is received in the adhesive pocket 28, an unnecessary space is not formed between the battery cell 10 and the cap cover 20 and external defects caused by overflowing of the adhesive can be prevented.

In addition, according to at least one of the disclosed embodiments, owing to the position alignment ribs 80, the battery cell 10 and the cap cover 20 are easily aligned and the position of the cap cover 20 do not vary, even when a welding electrode touches or impacts the cap cover 20. Therefore, the relative positions of the cap cover 20 and the battery cell 10 in the secondary battery can be firmly fixed.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details can be made therein without departing from the spirit and scope as defined by the following claims.

What is claimed is:

1. A secondary battery comprising:
a battery cell including an electrode, wherein the battery cell having a top surface;
a cap cover placed over the battery cell and having an opening that exposes the electrode;
a connection member placed over the cap cover and electrically connected to the electrode; and
a coupling structure that couples the battery cell and the cap cover, wherein the cap cover has a bottom surface configured to directly contact the top surface of the battery cell when the cap cover is coupled to the battery cell, wherein the bottom surface of the cap cover includes a recessed surface configured not to directly contact the top surface of the battery cell when the cap cover is coupled to the battery cell, wherein the coupling structure comprises a protrusion extending from the recessed surface of the cap cover toward the battery cell, an adhesive pocket formed to immediately surround the protrusion, and a concave portion formed in the battery cell so as to receive the protrusion, wherein the adhesive pocket is formed outside the concave portion of the battery cell, and wherein both the protrusion and the adhesive pocket are formed in the recessed surface of the cap cover.

2. The secondary battery of claim 1, wherein a groove is formed in the adhesive pocket to surround the protrusion.

3. The secondary battery of claim 1, further comprising a plurality of position alignment ribs formed over the cap cover and protruding toward the battery cell.

4. The secondary battery of claim 3, wherein the battery cell has upper edges, and wherein the position alignment ribs at least partially cover the upper edges of the battery cell.

5. The secondary battery of claim 3, wherein the position alignment ribs are formed in a length direction of the cap cover.

6. The secondary battery of claim 3, wherein the cap cover includes front and rear sides, wherein the battery cell includes an upper portion, and wherein the position alignment ribs include first and second position alignment ribs respectively formed over the front and rear sides of the cap cover so as to receive the upper portion of the battery cell therebetween.

7. The secondary battery of claim 3, wherein the cap cover comprises i pair of long sides extending in a length direction thereof and ii) a plurality of corner portions extending from opposing ends of the long sides, and wherein the position alignment ribs are formed along the long sides.

8. The secondary battery of claim 7, wherein the position alignment ribs do not extend to the corner portions.

9. The secondary battery of claim 1, wherein the battery cell includes an upper surface, and wherein the electrode comprises first and second electrodes formed over the upper surface of the battery cell and having different polarities.

10. The secondary battery of claim 9, wherein the connection member comprises first and second connection members electrically connected to the first and second electrodes, respectively.

11. The secondary battery of claim 10, wherein the first and second connection members at least partially overlap each other and extend substantially in parallel with each other.

12. The secondary battery of claim 10, wherein the opening of the cap cover comprises first and second openings respectively exposing the first and second electrodes.

13. The secondary battery of claim 12, further comprising a temperature sensor placed between the first electrode and the first connection member, wherein a third opening is formed in the cap cover to expose the temperature sensor.

14. The secondary battery of claim 1, wherein the adhesive pocket is thinner than the protrusion.

* * * * *